(12) United States Patent
Park

(10) Patent No.: US 6,374,638 B1
(45) Date of Patent: Apr. 23, 2002

(54) FABRICATION METHOD OF GRADED INDEX SILICA GLASS

(75) Inventor: Keun-Deok Park, Busan-kwangyeok-shi (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/784,968

(22) Filed: Feb. 16, 2001

(30) Foreign Application Priority Data

Sep. 5, 2000 (KR) .......................................... 00-52345

(51) Int. Cl.$^7$ ................................................. C03B 8/00
(52) U.S. Cl. ........................... 65/17.2; 65/378; 65/395; 65/440; 264/621; 501/12
(58) Field of Search ..................... 65/17.2, 378, 395, 65/440; 264/621; 501/12

(56) References Cited

U.S. PATENT DOCUMENTS

| | | | |
|---|---|---|---|
| 4,605,428 A | * 8/1986 | Johnson, Jr. et al. | 65/395 |
| 5,076,980 A | * 12/1991 | Nogues et al. | 264/621 |
| 6,158,244 A | * 12/2000 | Poco et al. | 65/17.2 |

FOREIGN PATENT DOCUMENTS

| | | | | |
|---|---|---|---|---|
| JP | 56-32344 | * | 4/1981 | 65/395 |
| JP | 56-37234 | * | 4/1981 | 65/395 |
| JP | 61-101425 | * | 5/1986 | 65/395 |

* cited by examiner

Primary Examiner—Michael Colaianni
(74) Attorney, Agent, or Firm—Steve Cha; Klauber & Jackson

(57) ABSTRACT

A fabrication method of graded index silica glass is disclosed. The method according to the present invention includes the steps of dispersing to form sol by mixing a starting material with a dispersion medium; molding the sol into a moisturized gel with a predetermined shape using a molding frame and separating the moisturized gel from the molding frame; drying the moisturized gel under a predetermined temperature and humidity level to remove the dispersion medium and to form a first dry gel having a predetermined moisture content distribution, hydrolyzing the moisture remained in the first dry gel and an additive solution by putting the first dry gel into the additive solution; re-drying the first dry gel, which underwent said hydrolysis, to form a second dry gel; and, thermal processing the second dry gel by supplying reaction gas thereto, removing impurities therefrom and annealing for isolation.

6 Claims, 4 Drawing Sheets

FABRICATION METHOD OF GRADED INDEX SILICA GLASS

CLAIM OF PRIORITY

This application makes reference to and claims all benefits accruing under 35 U.S.C. Section 119 from an application for FABRICATION METHOD OF GRADED INDEX SILICA GLASS filed earlier in the Korean Industrial Property Office on Sep. 15, 2000 and there duly assigned Serial No. 52345/2000.

BACKGROUND OF THE INVENTION

1. Field of the Invention

The present invention relates generally to a silica glass, and more particularly to a fabrication method of silica glass by a sol-gel process.

2. Description of the Related Art

Optical fibers are made to exacting dimension and compositional requirements. Normally, fiber manufacturing starts with a preform, which is a large cylinder of glass with the same composition as the final fiber, but at a much larger diameter. Different methods are used to make the preform. One of the methods includes Modified Chemical Vapor Deposition (MCVD), where high-performance single-mode fiber is made. The conventional optical transferring media such as lens or optical fiber with a convex graded index are fabricated through the MCVD process. The mechanisms of the MCVD process is disclosed on pages 138–147 of *J. Colloid Interface Sci.* 69, which is a thesis authored by Walker, K. L., Homsy, G. M. and Geyling, F. T. in the U.S. in 1979. This publication discloses a process of fabricating a silica glass by supplying and depositing raw material gas inside of a depositing tube, to which heat treatment is applied from outside.

In particular, the heat treatment using a burner which is supplied from outside forms a temperature field inside the depositing tube. If a critical temperature is formed inside the depositing tube through the heating via the burner, a rapid oxidization reaction occurs, thereby generating glass particles. The generated glass particles form a particle orbit due to the thermophoretic force generated by the temperature field. The glass particles move toward inside the depositing tube as the temperature of inner wall of the depositing tube is higher than the temperature of the gas. Therefore, some of the glass particles are evaporated on the inner surface of the depositing tube.

Gradient-index glass is often made in the form of solid cylindrical bodies, where the index of such bodies changes radially, usually with the highest index being along the axis of the cylinder and the lowest index located at the outer periphery. When fabricating such a silica glass using the MCDV method described above, it is sometimes difficult to properly control the amount of raw material gas supplied to the depositing tube in the course of deposition process to form the gradient-index profile inside of the silica glass. In addition, it requires a very long fabrication time during the deposition, and the cost of manufacturing is high.

SUMMARY OF THE INVENTION

It is, therefore, an object of the present invention to provide a method of fabricating gradient-index silica glass with a simpler fabricating process and lower fabricating cost than the modified chemical vapor-phase deposition (MCVD) process known in the prior art system.

Accordingly, there is provided a fabrication method of graded index silica glass, comprising the steps of: dispersing by mixing a starting material with a dispersion medium to form sol; molding by putting the sol within a molding frame to form moisturized gel and separating the moisturized gel from the molding frame; drying the moisturized gel under pre-set temperature and humidity and removing the dispersion medium inside of the moisturized gel to form a first dry gel having a pre-set moisture containing dispersion; hydrolyzing to induce hydrolysis between the remaining moisture inside of the first dry gel and an additive solution by putting the first dried gel into the additive solution; re-drying to form a second dry gel by re-drying the first dry gel, which underwent the hydrolysis; and, heating by supplying a reaction gas to the second dry gel, removing impure materials therefrom, and annealing the resultant material for vitrification.

BRIEF DESCRIPTION OF THE DRAWINGS

The above and other objects, features, and advantages of the present invention will become more apparent from the following detailed description when taken in conjunction with the accompanying drawing, in which.

DETAILED DESCRIPTION OF THE PREFERRED EMBODIMENTS

A preferred example of the present invention will be described herein below with reference to the accompanying drawing. For the purpose of clarity, well-known functions or constructions are not described in detail as they would obscure the invention in unnecessary detail.

Figure 1:
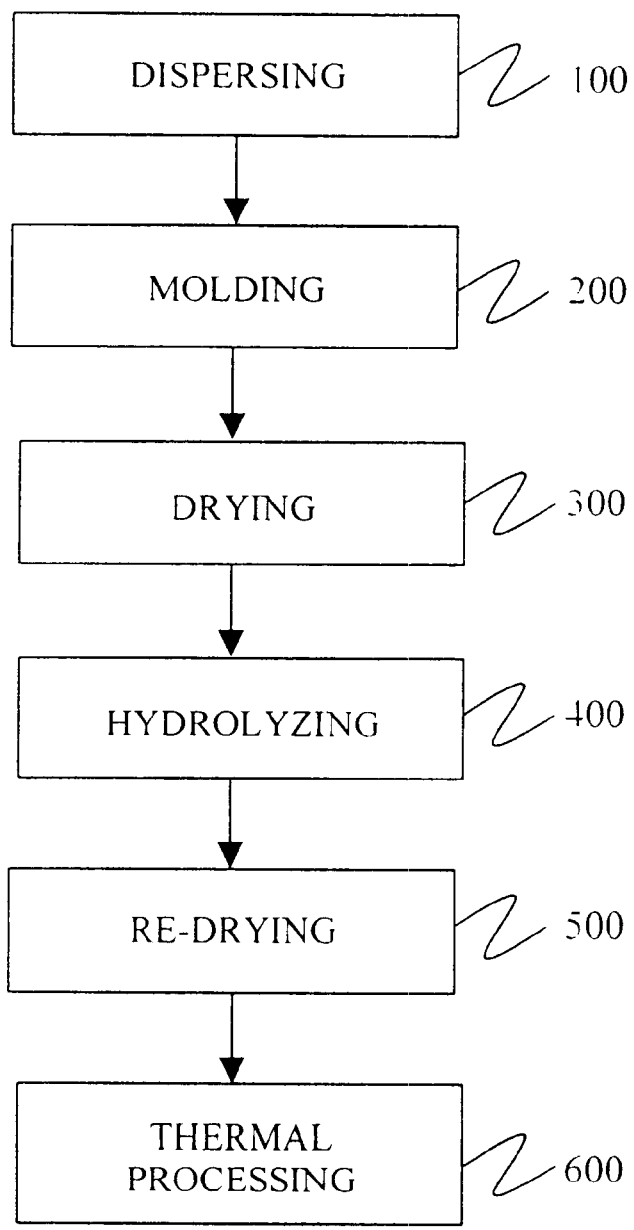
FIG. 1 is a flow chart showing a fabrication method of graded index silica glass using a sol-gel process according to a preferred of the present invention.

FIG. 1 is a flow chart showing the method for fabricating a gradient-index silica glass by a sol-gel process according to the preferred embodiment of the present invention. Referring to FIG. 1, the fabrication method of gradient-index silica glass using the sol-gel process comprises the following steps: dispersing step (100), molding step (200), drying step (300), hydrolyzing step (400), re-drying step (500), and thermal processing step (600).

1. Dispersing Step 100

According to the embodiment of the present invention, the dispersing step 100 involves forming a sol by mixing a starting material, preferably under agitation, with a dispersion medium in a controlled manner, so that the starting material can be uniformly dispersed into the dispersion medium. In this step, the dispersion agent may be added to enhance the dispersion process. Preferably, fuming silica or silicon alkoxide is used as the starting material, and de-ionized water or alcohols is used as the dispersion medium. Any well known dispersion agent in this art may be added to the mixture of the starting material and the dispersion medium.

2. Molding Step 200

According to the embodiment of the present invention, the molding step 200 is directed to molding the sol into a moisturized gel in a predetermined shape for sufficient time in order to form a gel, then separating the moisturized gel from the molding frame. Here, a binding agent and a gelation promoter may be added to the sol in this molding step 200 for the purpose of binding the sol particles.

3. Drying Step 300

Figure 2:
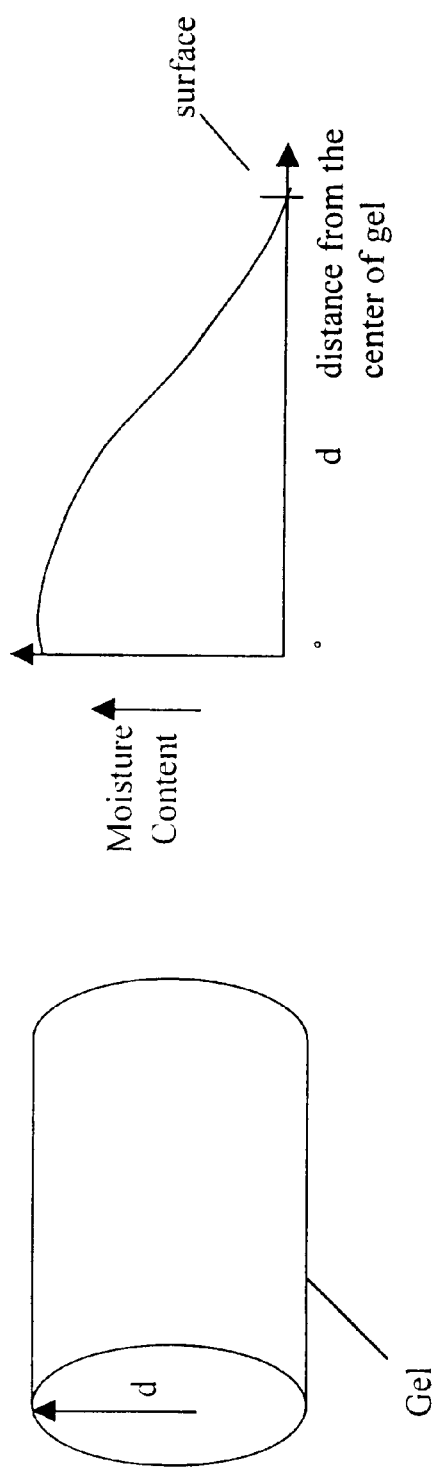
FIG. 2 is a graph illustrating the moisture content of a gel during drying stage a preferred of the present invention.

According to the embodiment of the present invention, the drying step 300 includes drying the moisturized gel under a prescribed temperature and humidity conditions, and removing the dried gel so as to form a first dry gel with a prescribed moisture content. The temperature and humidity conditions in the step 300 are determined by considering the components of the moisturized gel, properties of the silica glass to be obtained as a final product, etc. Depending on the example, the moisture content distribution may exhibit a parabolic shape with respect to the distance from the axis of the dry gel. Referring to FIG. 2, the moisture content is reduced in reverse proportion to the distance from the center of the first dry gel.

4. Hydrolyzing Step 400

According to the embodiment of the present invention, the hydrolyzing step 400 involves inducing a hydrolysis of the moisture remained in the first dry gel and the additive solution, by putting the first dry gel into the additive solution (i.e., $GeCl_4$ containing Ge or germanium ethoxide). To be specific, the hydrolyzing step 400 includes a step of forming an additive content distribution, which is identical to the moisture content distribution within the first dry gel, by using the reaction of the additive solution with the moisture within the first dry gel.

An alkoxide and $GeCl_4$ compounds have an OH sequence at the end by the hydrolysis process, thus the OH sequence is hydric-combined with an OH sequence of a gel particle. Here, $GeCl_4$ containing Ge or germanium ethoxide may be used as an additive solution. Thus, putting the first dry gel into the $GeCl_4$ results in a hydrolyzing reaction between the moisture within the first dry gel and the $GeCl_4$.

Figure 3:
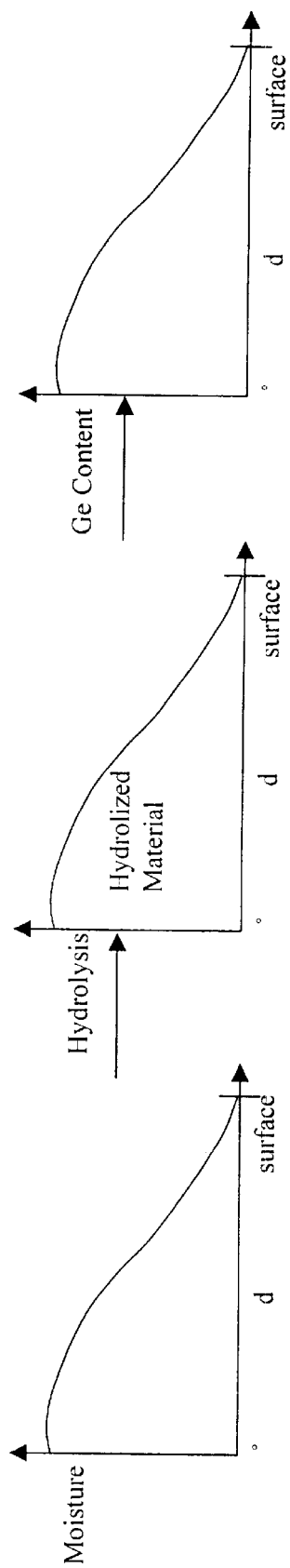
FIG. 3 is a graphical representation of a hydrolysis process according to a preferred of the present invention; and, FIG. 4 is a graphical representation of all phases according to a preferred of the present invention.

The content distribution within the first dry gel after undergoing the above hydrolyzing step is the same as that within the first dry gel. Referring to FIG. 3, if the moisture content distribution within the first dry gel makes a parabolic shape, the Ge content distribution within the first dry gel also makes the same parabolic shape. At this time, the additive with liquidity loses the liquidity after undergoing the hydrolysis and has a stable distribution by being bound with silica matrix particles. That is, the hydrolyzed material is hydric-combined with an OH sequence of silica matrix. Here, the temperature may be increased to be less than 100 C. for the purpose of accelerating the hydrolyzing reaction.

5. Re-drying Step 500

According to the embodiment of the present invention, the re-drying step 500 is a step of forming a second dry gel by re-drying the first dry gel after undergoing the hydrolyzing step, as described in the preceding paragraphs, so as to remove the moisture remained in the first dry gel.

6. Thermal Processing Step 600

According to the embodiment of the present invention, the thermal processing step 600 involves isolating the second dry gel by supplying reaction gas to remove impurities and for annealing. In particular, the thermal processing step 600 comprises the steps of: low thermal processing to decompose the organic matter within the second dry gel and remove the metallic impurities and OH sequence, etc. within the gel, by heating the gel under the atmosphere of Cl gas; and annealing the second dry gel that underwent the low thermal application inside an annealing firnace under the atmosphere of He gas for isolation.

Figure 4:
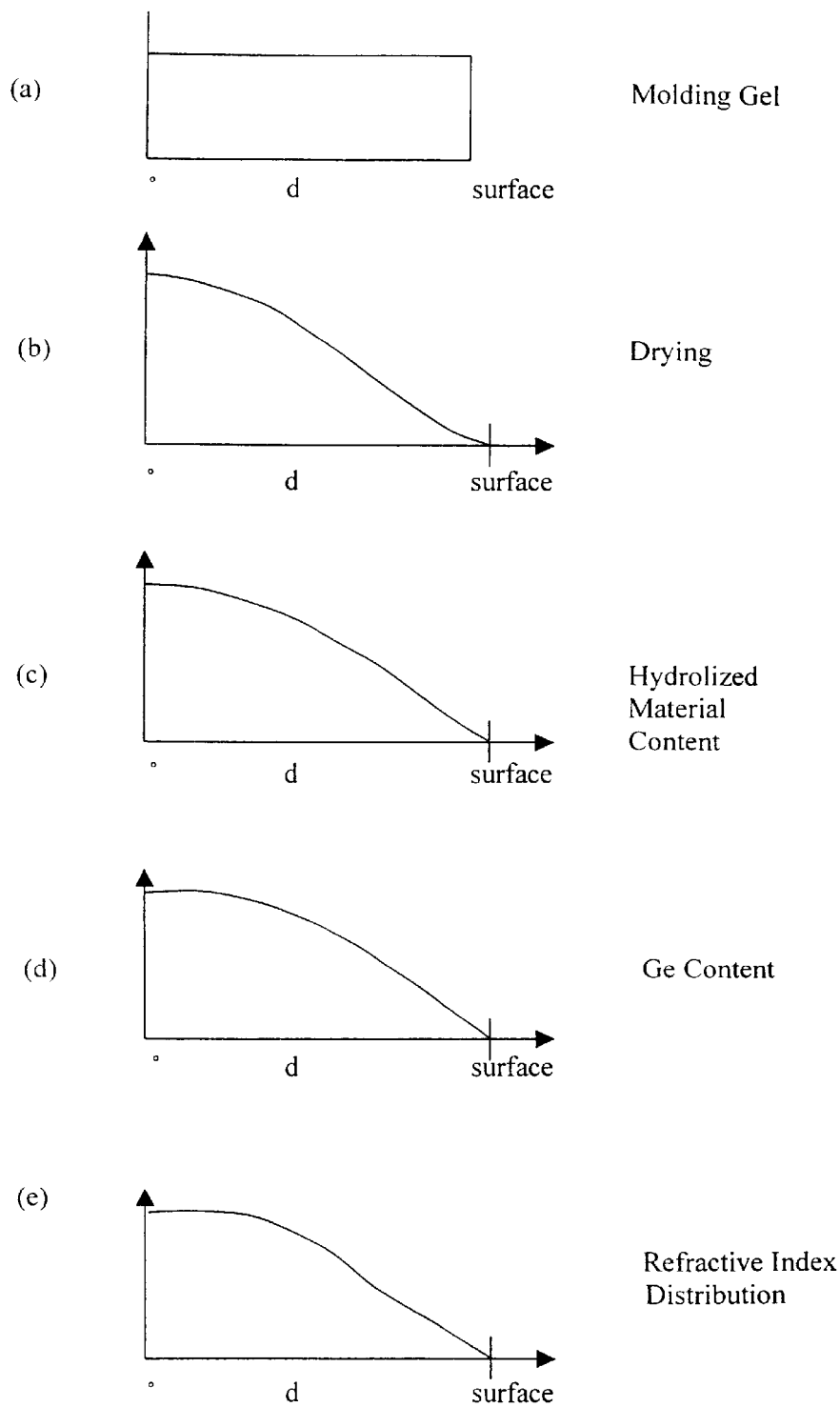

Referring to FIG. 4, the present invention provides a novel way in fabricating a graded-index silica glass through a sol-gel type process. As shown in FIG. 4, the formation of graded-index silica glass is achieved basically by preparing a gel; drying the moisturized gel under pre-set temperature and humidity; hydrolyzing to induce hydrolysis between the remaining moisture inside of the dry gel and an additive solution.

As described above, the fabrication method of graded-index silica glass according to the present invention has advantages in that a simpler and shorter fabricating process that is more economical than the conventional MCVD process is achieved.

What is claimed is:

1. A method of fabricating graded index silica glass, comprising the steps of:
    (a) preparing a sol by mixing a starting material with a dispersion medium;
    (b) molding said sol to a predetermined shape using a molding frame to obtain a wet gel and separating said wet gel from said molding frame;
    (c) drying said wet gel under a predetermined temperature and humidity to obtain a first dry gel having a predetermined moisture-content distribution;
    (d) hydrolyzing the moisture remained in said first dry gel by adding an additive solution to said first dry gel, said additive solution includes an alkoxide compound stabilized by a hydrolysis;
    (e) re-drying said first dry gel that is hydrolyzed to obtain a second dry gel; and,
    (f) thermal processing said second dry gel by exposing reaction gas for removing impurities from said second dry gel and annealing said thermal processed dry gel for isolation.

2. The method of claim 1, wherein said starting material in said dispersion step is fumed silica or silicon alkoxide.

3. The method of claim 1, wherein said dispersion medium in said dispersing step is de-ionized water or alcohol.

4. The method of claim 1, wherein said additive solution is GeCl4.

5. The method of claim 1, wherein said additive solution is germanium ethoxide.

6. The method of claim 1, wherein said moisture content distribution in said drying step changes radically with the highest moisture content along the axis of said first dry gel and the lowest moisture content being along the outer periphery.

* * * * *